(12) United States Patent
Kuroda et al.

(10) Patent No.: US 7,808,649 B2
(45) Date of Patent: Oct. 5, 2010

(54) FIXED-POINT DETECTOR AND DISPLACEMENT-MEASURING APPARATUS

(75) Inventors: Akihiro Kuroda, Tokyo (JP); Hideaki Tamiya, Kanagawa (JP)

(73) Assignee: Mori Seiki Co., Ltd., Nara (JP)

( * ) Notice: Subject to any disclaimer, the term of this patent is extended or adjusted under 35 U.S.C. 154(b) by 0 days.

(21) Appl. No.: 12/144,772

(22) Filed: Jun. 24, 2008

(65) Prior Publication Data

US 2009/0027687 A1    Jan. 29, 2009

(30) Foreign Application Priority Data

Jul. 24, 2007    (JP)    ............................... 2007-192681

(51) Int. Cl.
   *G01B 11/02*    (2006.01)
(52) U.S. Cl. .................................... 356/499
(58) Field of Classification Search ................. 356/498, 356/499
   See application file for complete search history.

(56) References Cited

U.S. PATENT DOCUMENTS 6,429,940 B1 *    8/2002    Willhelm ................... 356/499

| 2001/0017696 | A1* | 8/2001 | Narita et al. | 356/499 |
| 2002/0021450 | A1* | 2/2002 | Aoki | 356/499 |
| 2002/0080365 | A1* | 6/2002 | Monshouwer et al. | 356/508 |
| 2006/0145066 | A1* | 7/2006 | Tamiya | 250/231.13 |

FOREIGN PATENT DOCUMENTS

JP    04-324316    11/1992

* cited by examiner

*Primary Examiner*—Tarifur Chowdhury
*Assistant Examiner*—Jonathon D Cook
(74) *Attorney, Agent, or Firm*—Sonnenschein Nath & Rosenthal LLP (57) ABSTRACT

A fixed-point detector is provided. The fixed-point detector includes a plurality of fixed-point detecting patterns, a fixed-point detecting light source, and a plurality of photoelectric conversion elements. The plurality of fixed-point detecting patterns each have a pair of diffraction gratings for diffracting incident light in different directions. The fixed-point detecting light source irradiates the pair of diffraction gratings with light while moving in the measurement-axis direction with respect to the plurality of fixed-point detecting patterns. The plurality of photoelectric conversion elements move together with the fixed-point detecting light source, while receiving light beams diffracted by the respective diffraction gratings of the plurality of fixed-point detecting patterns and converting the diffracted light beams into electric signals.

8 Claims, 10 Drawing Sheets

POSITION n1

FIG. 2B

POSITION n2

FIG. 2C

POSITION n3

POSITION n4

FIG. 4B

POSITION n5

FIG. 4C

POSITION n6

FIG. 5

FIG. 6A
POSITION n7

FIG. 6B
POSITION n8

FIG. 6C
POSITION n9

FIXED-POINT DETECTOR AND DISPLACEMENT-MEASURING APPARATUS

CROSS REFERENCES TO RELATED APPLICATIONS

The present invention contains subject matter related to Japanese Patent Application JP 2007-192681 filed in the Japanese Patent Office on Jul. 24, 2007, the entire contents of which being incorporated herein by reference.

BACKGROUND OF THE INVENTION

1. Field of the Invention

The present invention relates to a fixed-point detector for detecting a signal from light diffracted by a diffraction grating and then obtaining a fixed point on the basis of the signal, and also relates to a displacement-measuring apparatus provided with such a fixed-point detector.

2. Description of the Related Art

Heretofore, a displacement-measuring apparatus having a scale and a detection head has been known as a measuring apparatus for carrying out a precision measurement of linear displacement, rotational displacement, or the like. Such a displacement-measuring apparatus has been widely used for an apparatus for mounting electric parts, in which high-precision positioning control of a product being fed may be required, a measuring apparatus for measuring the dimensions of a component, or the like. Such a displacement-measuring apparatus is provided with a fixed-point detector and a base position for the measurement or fixed point (starting point) has been defined.

Japanese Unexamined Patent Application Publication No. 04-324316 describes an example of the related-art fixed-point detector. Specifically, the Patent Document descries a fixed-point detector suitably installed in a linear encoder, a rotary encoder, or the like by which the position of an object can be optically detected. The fixed-point detector described in the above Patent Document includes "a pair of diffraction gratings, with which diffraction efficiencies of incident light vary in the measurement direction, each dividing light from a single light source into two light beams; a photoelectric converter converting the light beams diffracted from the respective diffraction gratings into electric signals; and a detector detecting that the levels of the electric signals being converted are coincident with each other".

In the fixed-point detector described in the above-described Patent Document, light beams diffracted from the pair of diffraction gratings, with which diffraction efficiencies vary in the measurement direction, are converted by two photoelectric converters into electric signals, respectively. Subsequently, a position at which levels of two electric signals are coincident with each other is defined as a specified point.

SUMMARY OF THE INVENTION

On the other hand, positions to be provided as reference points (fixed points) vary depending on the arrangement of a material to be measured, structural components, or the like. Thus, in a related-art displacement-measuring apparatus, a scale is provided with a plurality of pairs of diffraction gratings (patterns for fixed-point detection) of the fixed-point detector described in Japanese Unexamined Patent Application Publication No. 04-324316 to determine the position of the fixed point by selecting any one of these pairs.

However, the plural patterns for fixed-point detection have not been distinguished from one another if two or more fixed-point detecting patterns of the fixed-point detector described in Japanese Unexamined Patent Application Publication No. 04-324316 are mounted on the scale of the displacement-measuring apparatus. Therefore, for determining the position of a fixed point by selecting any one of the above patterns, the other patterns than the selected one should be covered with a shading sheet or the like. Therefore, there is a problem of forcing complicated work upon a user.

It is desirable to provide a fixed-point detector which can distinguish each fixed-point detecting pattern from others even in the case of having a plurality of fixed-point detecting patterns and select a desired fixed point in a simplified manner without shading. It is also desirable to provide a displacement-measuring apparatus having such a fixed-point detector.

According to an embodiment of the present invention, there is provided a fixed-point detector including a plurality of fixed-point detecting patterns, a fixed-point detecting light source, and a plurality of photoelectric conversion elements. Each of the fixed-point detecting patterns has a pair of diffraction gratings for diffracting incident light in different directions. These patterns are arranged at an appropriate distance from one another in a measurement-axis direction. The fixed-point detecting light source irradiates the pair of diffraction gratings of each of the fixed-point detecting patterns with light while moving in the measurement-axis direction with respect to the plurality of fixed-point detecting patterns. The plurality of photoelectric conversion elements move together with the fixed-point detecting light source, while receiving light beams diffracted by the respective diffraction gratings of the plurality of fixed-point detecting patterns and converting the diffracted light beams into electric signals. The fixed-point detector employs different combinations of two photoelectric conversion elements for receiving two light beams diffracted by the diffraction gratings of the respective fixed-point detecting patterns. Thus, a fixed point is defined as a point at which a level of an electric signal converted by one of the photoelectric conversion elements is equal to a level of an electric signal converted by the other thereof.

According to another embodiment of the present invention, there is provided a displacement-measuring apparatus including a scale, a detection head, and a fixed-point detector. The scale has a displacement-measuring diffraction grating arranged along a measurement axis. The detection head includes a displacement-measuring light source and a displacement-measuring photoelectric conversion element. The displacement-measuring light source is provided for irradiating the displacement-measuring diffraction grating with light while moving in the direction of the measurement axis with respect to the scale. The displacement-measuring photoelectric conversion element receives light diffracted by the displacement-measuring diffraction grating, and then converts the light into an electric signal. The fixed-point detector detects a fixed point of the detection head with respect to the scale. The fixed-point detector includes a plurality of fixed-point detecting patterns, a fixed-point detecting light source, and a plurality of photoelectric conversion element. Each of the fixed-point detecting patterns has a pair of diffraction gratings for diffracting incident light in different directions. These patterns are arranged at an appropriate distance from one another in a measurement-axis direction. The fixed-point detecting light source irradiates the pair of diffraction gratings of each of the fixed-point detecting patterns with light while moving in the measurement-axis direction with respect to the plurality of the fixed-point detecting patterns. The plurality of photoelectric conversion elements move together with the fixed-point detecting light source, while receiving light beams diffracted by the respective diffraction gratings of the plurality of fixed-point detecting patterns and converting the diffracted light beams into electric signals. The fixed-point detector employs different combinations of two photoelectric conversion elements for receiving two light beams diffracted by the diffraction gratings of the respective fixed-point detecting patterns. Thus, a fixed point is defined as a point at which a level of an electric signal converted by one of the photoelectric conversion elements is equal to a level of an electric signal converted by the other thereof.

According to the above-described embodiments of the present invention, the fixed-point detector and the displacement-measuring apparatus having such a fixed-point detector can distinguish one from others in a plurality of fixed-point detecting patterns and a fixed point to be used can be selected easily even without shading the unused fixed-point detecting patterns.

BRIEF DESCRIPTION OF THE DRAWINGS

FIGS. 2A to 2C are schematic diagrams each illustrating a state in which light from a fixed-point detecting light source is incident on a first fixed-point detecting pattern of the fixed-point detector according to the first embodiment of the present invention, where

FIGS. 4A to 4C are schematic diagrams each illustrating a state in which light from a fixed-point detecting light source is incident on a second fixed-point detecting pattern of the fixed-point detector according to the first embodiment of the present invention, where

FIGS. 6A to 6C are perspective diagrams each illustrating a fixed-point detector according to a second embodiment of the present invention, where

FIGS. 12A and 12B are diagrams illustrating a state in which a scale of the displacement-measuring apparatus provided with the fixed-point detector according to the third embodiment of the present invention is rotationally displaced in a direction perpendicular to the measurement-axis direction, where

DESCRIPTION OF THE PREFERRED EMBODIMENTS

Hereinafter, the preferred embodiments of the fixed-point detector and the displacement-measuring apparatus of the present invention will be described with reference to the attached drawings. However, the present invention is not limited to the following embodiments.

Figure 1:
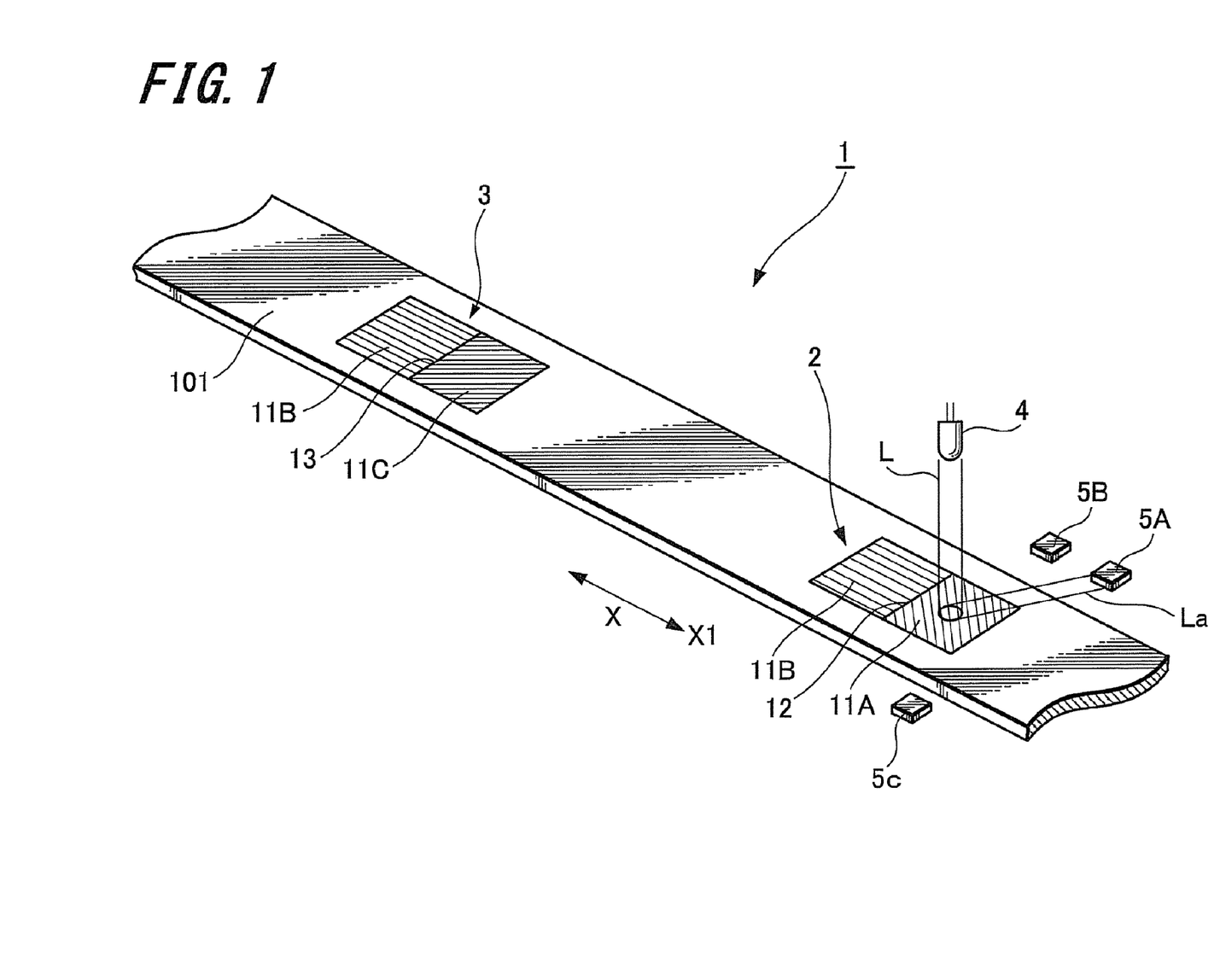
FIG. 1 is a perspective diagram illustrating a fixed-point detector according to a first embodiment of the present invention.

FIG. 1 is a perspective diagram illustrating a fixed-point detector as a first embodiment of the present invention. The fixed-point detector 1 includes: a first fixed-point detecting pattern 2; a second fixed-point detecting pattern 3; a fixed-point detecting light source 4, which is movable in the direction X along which a measurement is carried out (hereinafter, referred as the measurement-axis direction X) in a relative manner with respect to the first fixed-point detecting pattern 2 and the second fixed-point detecting pattern 3; and three photoelectric conversion elements 5A, 5B, and 5C, which are movable together with the fixed-point detecting light source 4.

The first fixed-point detecting pattern 2 and the second fixed-point detecting pattern 3 are mounted on a transport member 101 which is movable in the measurement-axis direction X. In addition, these patterns 2 and 3 are arranged at an appropriate distance from each other in the measurement-axis direction X. Furthermore, the fixed-point detecting light source 4 and the three photoelectric conversion elements 5A and 5B, and 5C are mounted on a fixing member (not shown).

The first fixed-point detecting pattern 2 includes a pair of diffraction gratings 11A and 11B that diffract incident light in different directions, respectively. The paired diffraction gratings 11A and 11B are formed in the same square shape and aligned in the measurement-axis direction X so that their respective sides can abut on each other to form a border line 12.

Similar to the first fixed-point detecting pattern 2 the second fixed-point detecting pattern 3 includes a pair of diffraction gratings 11B and 11C that diffract incident light in different directions, respectively. The paired diffraction gratings 11B and 11C are formed in the same square shape and aligned in the measurement-axis direction X so that their respective sides can abut on each other to form a border line 13.

The first fixed-point detecting pattern 2 and the second fixed-point detecting pattern 3 have different combinations of diffraction gratings, respectively. In the present embodiment, the first-point detecting pattern 2 and the second fixed-point detecting pattern 3 have common diffraction gratings 11B but they have different other diffraction gratings 11A and 11C.

The fixed-point detecting light source 4 may be, for example, a light emitting diode (LED), a semiconductor laser, or the like. The light L emitted from the fixed-point detecting light source 4 can be incident at a substantially right angle on the pair of diffraction gratings 11A and 11B of the first fixed-point detecting pattern 2 and the pair of diffraction gratings 11B and 11C of the second fixed-point detecting pattern 3.

Figure 2A:
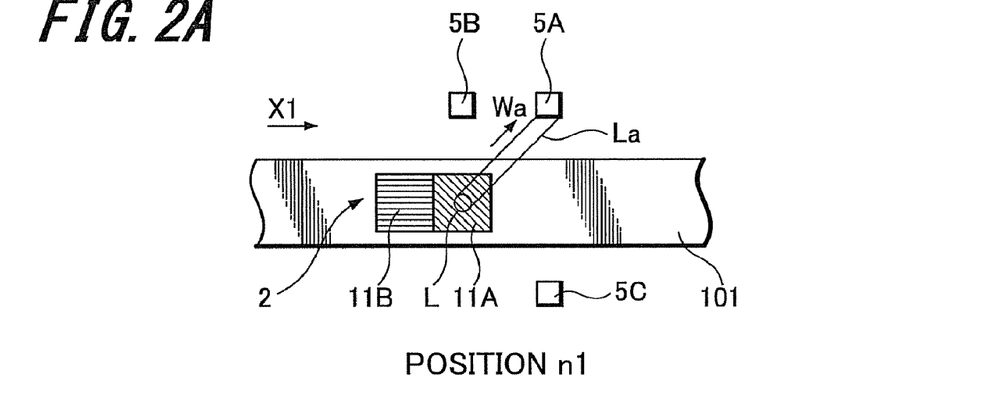
FIG. 2A is an explanatory view of a state in which light is incident on one of paired diffraction gratings of the first fixed-point detecting pattern.
Figure 2B:
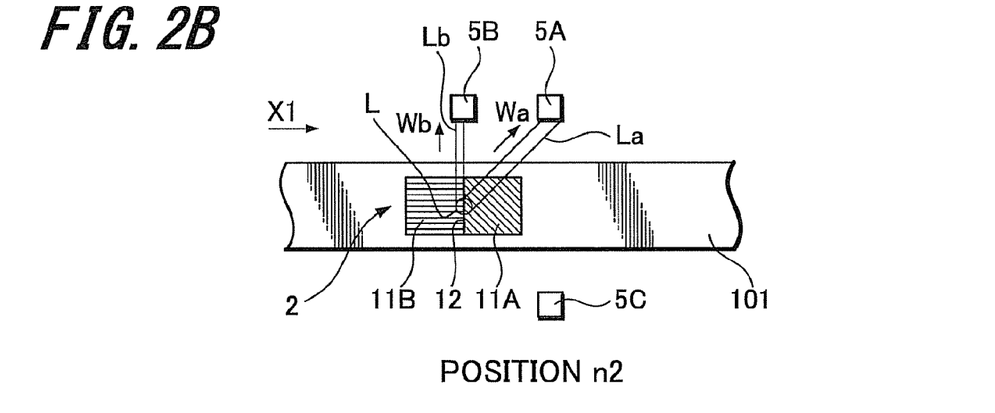
FIG. 2B is an explanatory view of a state in which light is incident on the boundary line between the paired diffraction gratings.
Figure 2C:
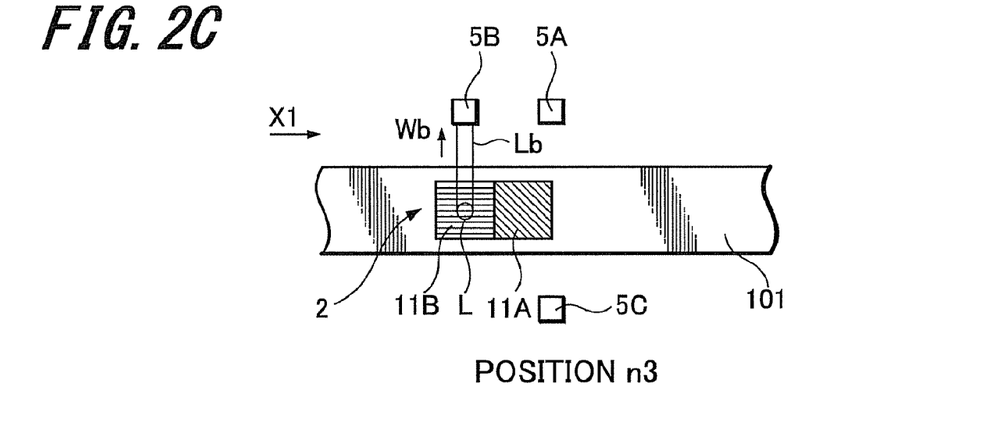
FIG. 2C is an explanatory view of a state in which light is incident on the other of the paired diffraction gratings.

As illustrated in FIGS. 2A to 2C, the photoelectric conversion element 5A receives a light beam La diffracted by the diffraction grating 11A and then converts the diffracted light beam La into an electric signal. Likewise, the photoelectric conversion element 5B receives a light beam Lb diffracted by the diffraction grating 11B and then converts the diffracted light beam Lb into an electric signal. The photoelectric conversion element 5C receives a light beam Lc diffracted by the diffraction grating 11C, and then converts the diffracted light Lc into an electric signal.

Therefore, the light beams diffracted by the pair of diffraction gratings 11A and 11B of the first fixed-point detecting pattern 2 are received by the photoelectric conversion elements 5A and 5B, respectively. In addition, the light beams diffracted by the pair of diffraction gratings 11B and 11C of the second fixed-point detecting pattern 3 are received by the photoelectric conversion elements 5B and 5C. In other words, different combinations of two photoelectric conversion elements can receive two diffracted light beams diffracted by the respective fixed-point detecting patterns 2, 3, respectively. These three photoelectric conversion elements 5A, 5B, and 5C may be, for example, photodiodes (PDs), phototransistors, or the like.

Figure 3:
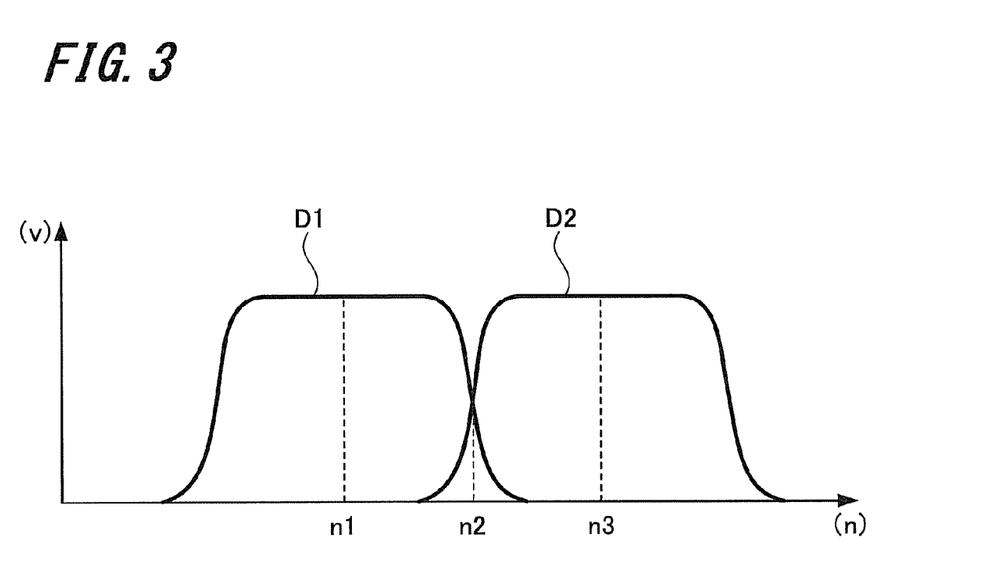
FIG. 3 is a graphic diagram illustrating light-intensity curves that represent changes in output levels of electric signals converted by two photoelectric conversion elements corresponding to the paired diffraction gratings of the first fixed-point detecting pattern as shown in FIG. 2.

Referring now to FIGS. 2A to 2C and FIG. 3, the detection of a first fixed point P1 to be obtained by the first fixed-point detecting pattern 2 will be described. FIGS. 2A to 2C are schematic diagrams each illustrating the state of light L incident on the first fixed-point detecting pattern 2 from the fixed-point detecting light source 4. FIG. 3 represents the curves of light intensities, D1 and D2, which reflect changes in output levels of electrical signals converted by the photoelectric conversion elements 5A and 5B, respectively. In FIG. 3, the horizontal axis represents the position (n) of the first fixed-point detecting pattern 2 with respect to light L and the vertical axis represents the level (V) of the electric signal output from each of the photoelectric conversion elements 5A and 5B.

Light L output from the fixed-point detecting light source 4 is incident on the first fixed-point detecting pattern 2 substantially at a right angle as the transport member 101 moves in the measurement-axis direction X. Here, the description will be made with respect to a case where the transport member 101 moves in the measurement-axis direction X1 and light L is incident on the first fixed-point detecting pattern 2. First, light L is incident on the diffraction grating 11A of the first fixed-point detecting pattern 2 when the transport member 101 moves in the direction X1.

FIG. 2A illustrates that the first fixed-point detecting pattern 2 is located at a position n1 with respect to light L. In other words, FIG. 2A illustrates a state in which the beam spot of light L is located at substantially the center of the diffraction grating 11A of the first fixed-point detecting pattern 2. As shown in FIG. 2A, the light L incident on the diffraction grating 11A is diffracted by the diffraction grating 11A to cause a diffracted light beam La traveling in the direction Wa. Subsequently, the diffracted light beam La is received by the photoelectric conversion element 5A and then converted into an electric signal. The electric signal converted by the photoelectric conversion element 5A is output as a current signal and then converted into a voltage signal by a current voltage converter (not shown).

In FIG. 3, the first light-intensity curve D1 represents a change in the level of voltage signal output through the photoelectric conversion element 5A and the second light-intensity curve D2 represents a change in the level of voltage signal output through the photoelectric conversion element 5B. When the first fixed-point detecting pattern 2 is located at a position n1, the beam spot of light L is completely located within the diffraction grating 11A of the first fixed-point detecting pattern 2 (see FIG. 2A). Thus, the voltage signal output through the photoelectric conversion element 5A will reach the maximum level.

When the transport member 101 further moves from the position n1 shown in FIG. 2A in the direction X1, part of the light L is incident on the diffraction grating 11B of the first fixed-point detecting pattern 2. In this case, as shown in FIG. 2B, the first fixed-point detecting pattern 2 is located at a position n2 with respect to light L. The center of the beam spot of light L is located on the boundary line 12 between the diffraction gratings 11A and 11B provided in a pair.

As shown in FIG. 2B, the light L incident on both the diffraction gratings 11A and 11B in a pair is divided into a diffracted light beam La traveling in the direction Wa as a result of diffraction by the diffraction grating 11A and a diffracted light beam Lb traveling in the direction Wb as a result of diffraction by the diffraction grating 11B. The diffracted light beam La and the diffracted light beam Lb are received by the photoelectric conversion elements 5A and 5B and then converted into electric signals, respectively. The electric signal converted by the photoelectric conversion element 5B is output as a current signal in the same way as one converted by the photoelectric conversion element 5A, and then converted into a voltage signal by the current voltage converter (not shown).

In the case where the first fixed-point detecting pattern 2 is located at a position n2, the beam spot of light L is equally shared by the diffraction gratings 11A and 11B in a pair. At the position n2, as shown in FIG. 3, half the maximum output level of the voltage signal obtained through the photoelectric conversion element 5A is equal to half the maximum output level of the voltage signal obtained at the position n2 through the photoelectric conversion element 5B. A first fixed point P1 can be detected using a comparator (differential amplifier) that detects the point where both the output levels are equal. In other words, the fixed-point detector 1 detects the first fixed point P1 when the first fixed-point detecting pattern 2 is located at the position n2.

When the transport member 101 further moves from the position shown in FIG. 2B in the direction X1, light L is entirely incident on the diffraction grating 11B of the first fixed-point detecting pattern 2. FIG. 2C illustrates that the first fixed-point detecting pattern 2 is located at a position n3 with respect to light L, showing a state in which the beam spot of light L is located at substantially the center of the diffraction grating 11B. As shown in FIG. 2C, when the first fixed-point detecting pattern 2 is located at the position n3, the beam spot of light L is entirely located within the diffraction grating 11B of the first fixed-point detecting pattern 2. Therefore, as shown in FIG. 3, a voltage signal output through the photoelectric conversion element 5B reaches the maximum level at the position n3.

Figure 4A:
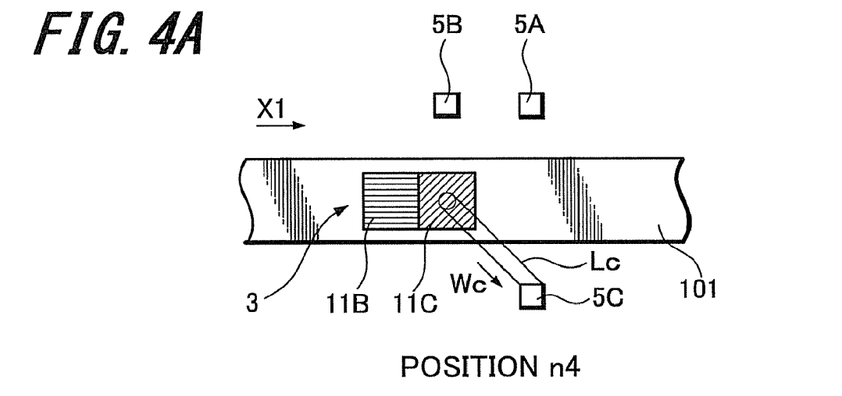
FIG. 4A is an explanatory view of a state in which light is incident on one of paired diffraction gratings of the second fixed-point detecting pattern.
Figure 4B:
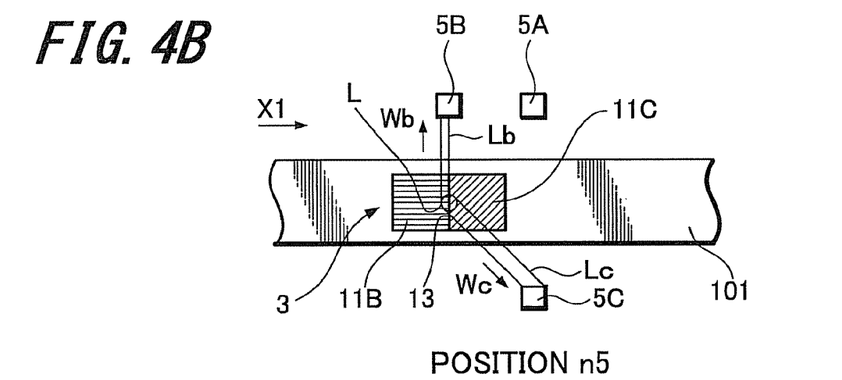
FIG. 4B is an explanatory view of a state in which light is incident on the boundary line between the paired diffraction gratings.
Figure 4C:
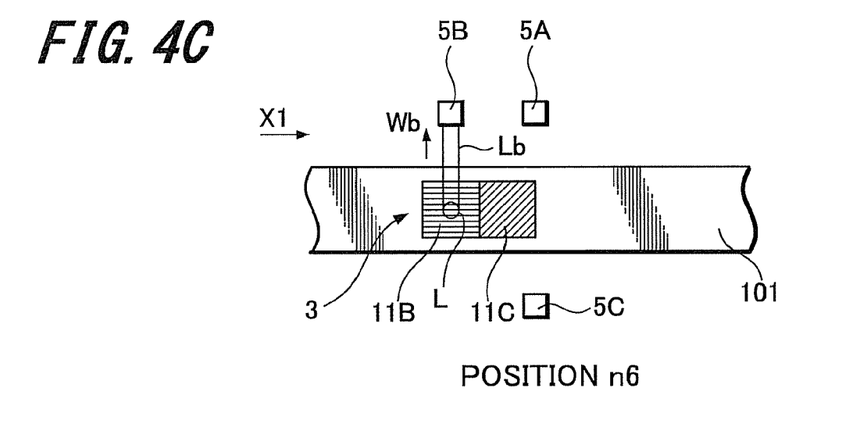
FIG. 4C is an explanatory view of a state in which light is incident on the other of the paired diffraction gratings.
Figure 5:
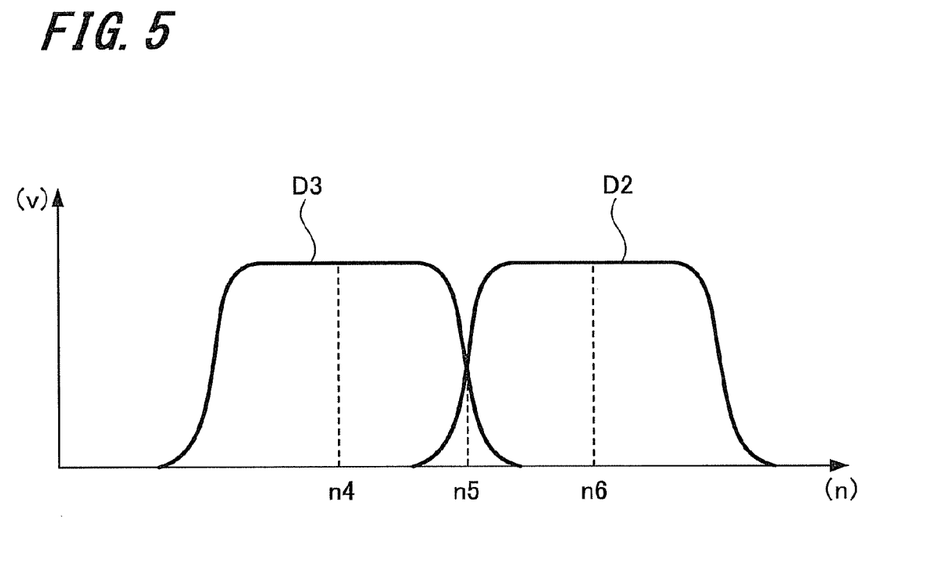
FIG. 5 is a graphic diagram illustrating light-intensity curves that represent changes in output levels of electric signals converted by two photoelectric conversion elements corresponding to the paired diffraction gratings of the second fixed-point detecting pattern as shown in FIG. 4.

Referring now to FIGS. 4 and 5, the detection of the second fixed position P2 which can be obtained on the second fixed-point detecting pattern 3 will be described. FIGS. 4A to 4C are schematic diagrams each illustrating the state of light L incident on the second fixed-point detecting pattern 2 from the fixed-point detecting light source 4. FIG. 5 represents the curves of light intensities, D2 and D3, which reflect changes in output levels of electrical signals converted by the photoelectric conversion elements 5B and 5C, respectively. In FIG. 5, the horizontal axis represents the position (n) of the second fixed-point detecting pattern 3 with respect to light L and the vertical axis represents the level (V) of the voltage signal output from each of the photoelectric conversion elements 5B and 5C.

Here, the description will be made with respect to a case where the light L is incident on the second fixed-point detecting pattern 3 as the position of the transport member 101 moves in the direction X1. When the transport member 101 moves in the direction X1, the light L is incident on the diffraction grating 11c of the second fixed-point detecting pattern 3. In other words, FIG. 4A illustrates a state in which the beam spot of light L is located at substantially the center of the diffraction grating 11C of the second fixed-point detecting pattern 3 as the second fixed-position detecting pattern 3 is located at a position n4 with respect to light L. As shown in this figure, the light L incident on the diffraction grating 11C is diffracted by the diffraction grating 11C to cause a diffracted light beam Lc traveling in the Wc direction. Subsequently, the diffracted light beam Lc is received by the photoelectric conversion element 5C and then converted into an electric signal. The electric signal converted by the photoelectric conversion element 5C is output as a current signal and then converted into a voltage signal by a current voltage converter (not shown).

In FIG. 5, the second light-intensity curve D2 represents a change in the level of voltage signal output through the photoelectric conversion element 5B and the third light-intensity curve D3 represents a change in the level of voltage signal output through the photoelectric conversion element 5C. When the second fixed-point detecting pattern 3 is located at a position n4, the beam spot of light L is completely located within the diffraction grating 11C of the second fixed-point detecting pattern 3 (see FIG. 4A). Thus, the voltage signal output through the photoelectric conversion element 5C will reach the maximum level.

When the transport member 101 further moves from the position n4 shown in FIG. 4A in the direction X1, part of the light L is incident on the diffraction grating 11B of the second fixed-point detecting pattern 3. In this case, as shown in FIG. 4B, the second fixed-point detecting pattern 3 is located at a position n5 with respect to light L. The center of the beam spot of light L is located on the boundary line 13 between the diffraction gratings 11B and 11C in a pair.

As shown in FIG. 4B, the light L incident on both the diffraction gratings 11B and 11C in a pair is divided into diffracted light Lb traveling in the direction Wb as a result of diffraction by the diffraction grating 11B and diffracted light Lc traveling in the Wc direction as a result of diffraction by the diffraction grating 11C. The diffracted light Lb and the diffracted light Lc are received and converted into electric signals by the photoelectric conversion elements 5B and 5C, respectively.

In the case where the second fixed-point detecting pattern 3 is located at a position n5, the beam spot of light L is equally shared by the diffraction gratings 11B and 11C in a pair. At the position n5, as shown in FIG. 5, half the maximum output level of the voltage signal obtained through the photoelectric conversion element 5B is equal to half the maximum output level of the voltage signal obtained at the position n5 through the photoelectric conversion element 5C. The second fixed point P2 can be detected when the comparator (differential amplifier) detects the point where both the output levels are equal. In other words, the fixed-point detector 1 detects the second fixed point P2 when the second fixed-point detecting pattern 3 is located at the position n5.

Subsequently, when the transport member 101 further moves from the position shown in FIG. 4B in the direction X1, the light L is entirely incident on the diffraction grating 11B of the second fixed-point detecting pattern 3. FIG. 4C illustrates that the second fixed-point detecting pattern 3 is located at a position n6 with respect to light L, showing a state in which the beam spot of light L is located at substantially the center of the diffraction grating 11B. In the case where the second fixed-point detecting pattern 3 is located at the position n6, the beam spot of light L is entirely located within the diffraction grating 11B of the second fixed-point detecting pattern 2. Therefore, as shown in FIG. 5, a voltage signal output through the photoelectric conversion element 5B reaches the maximum level at the position n6.

According to the fixed-point detector having the configuration as described above, the first fixed point P1 can be detected from voltage signals obtained through the photoelectric conversion elements 5A, 5B and the second fixed point P2 can be detected from voltage signals obtained through the photoelectric conversion elements 5A, 5C. Therefore, the first fixed point P1 can be distinguished from the second fixed point P2. For example, if the second fixed point P2 is not used, the first fixed point P1 can be selected easily without preventing the second fixed-point detecting pattern 3 from light exposure.

In the above-described embodiment, both the first fixed-point detecting pattern 2 and the second fixed-point detecting pattern 3 are provided for detecting the first fixed point P1 and the second fixed point P2. Alternatively, three or more fixed-point detecting patters may be provided for detecting three or more fixed points. For detecting three fixed points, for example, an additional fixed-point detecting pattern having a pair of diffraction gratings 11A and 11C may be provided as a third one in addition to the first fixed-point detecting pattern 2 and the second fixed-point detecting pattern 3 as described in the above-described embodiment.

In other words, the number of fixed points which can be detected by the fixed-point detector is $N(N-1)/2$ (N is an integer, $N \geq 3$) when the fixed-point detector is provided with N photoelectric conversion elements such that different combinations of two photoelectric conversion elements for receiving two light beams diffracted by the respective fixed-point detecting patterns will be obtained so as to distinguish the fixed-points.

Figure 6A:
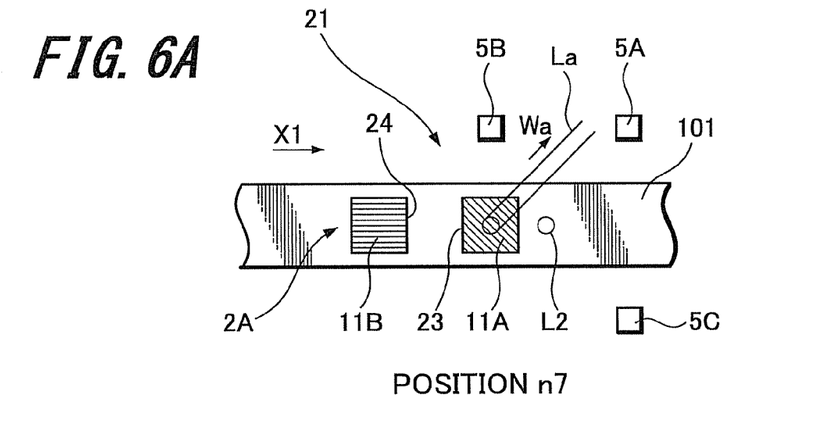
FIG. 6A is an explanatory view of a state in which a first light beam is incident on one of paired diffraction gratings of the first fixed-point detecting pattern.
Figure 6B:
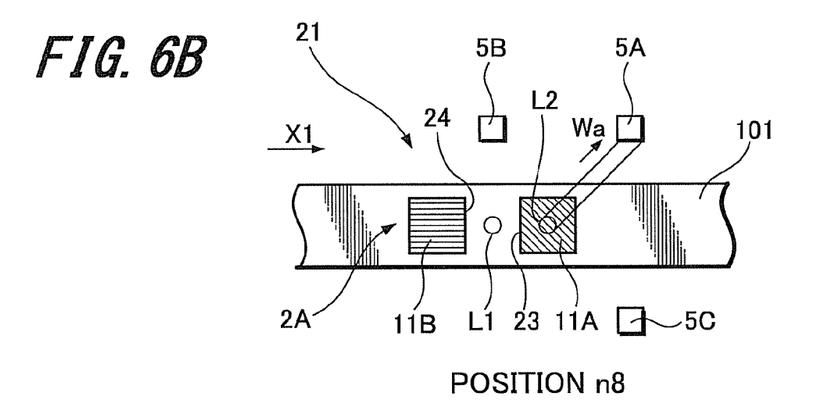
FIG. 6B is an explanatory view of a state in which a second light beam is incident on the other of the paired diffraction gratings.
Figure 6C:
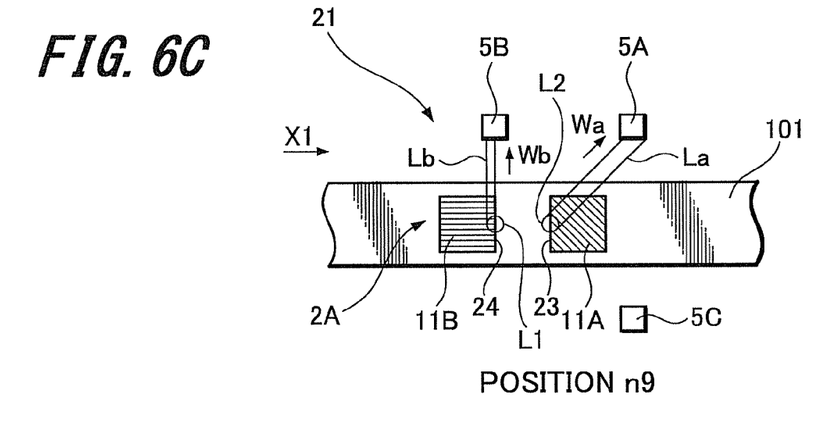
FIG. 6C is an explanatory view of a state in which the first light beam is incident on one of the diffraction gratings while the second light beam is incident on the other of the diffraction gratings.

FIGS. 6A to 6C are schematic diagrams for illustrating a fixed-point detector as a second embodiment of the present invention. The fixed-point detector 21 has the same configuration as that of the fixed-point detector 1 of the first embodiment, except for the arrangement of a pair of diffraction gratings of a fixed-point detecting pattern. In this embodiment, therefore, the arrangement of the pair of diffraction gratings of the fixed-point detecting pattern will be described, while the same parts as those of the fixed-point detector 1 are provided with the same reference numerals as those of the fixed-point detector 1 to omit duplicate explanation.

The arrangement of the diffraction gratings in a pair on the fixed-point detector 21 will be described with reference to the first fixed-point detecting pattern 2A as an example. The first fixed-point detecting pattern 2A of the fixed-point detector 21 includes a pair of diffraction gratings 11A and 11B formed in the same square shape. These diffraction gratings 11A and 11B in a pair are arranged at a predetermined distance from each other in the measurement-axis direction X.

A half mirror (not shown) divides light L emitted from a fixed-point detecting light source 4 (not shown) into two light beams, first light beam L1 and second light beam L2, which are then incident on a first fixed-point detecting pattern 2A. In this case, the light L is divided into two light beams L1 and L2 such that they have the same amount of light. The beam spots of the respective two light beams L1 and L2 are located at a predetermined distance from each other in the measurement-axis direction X. In this embodiment, the distance from the center of the beam spot of the light beam L1 to the center of the beam spot of the light beam L2 is set to be equal to a distance between the side 23 of the diffraction grating 11A and the side 24 of the diffraction grating 11B in a pair, facing each other.

Figure 7:
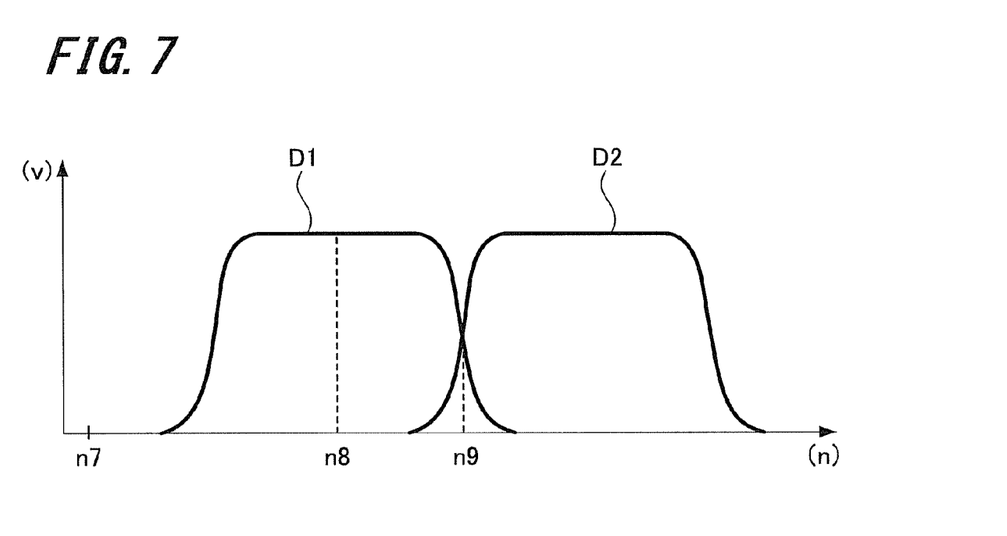
FIG. 7 is a graphic diagram illustrating light-intensity curves that represent changes in output levels of electric signals converted by two photoelectric conversion elements corresponding to the paired diffraction gratings of the first fixed-point detecting pattern as shown in FIG. 6.

Next, the detection of the first fixed point P1 obtained by the first fixed-point detecting pattern 2A will be described with reference to FIGS. 6A to 6C and FIG. 7. FIG. 7 illustrates a light-intensity curve representing a change in the level of output electric signal converted by each of photoelectric conversion elements 5A and 5B. In the figure, the horizontal axis represents the position n of the first fixed-point detecting pattern 2A with respect to two light beams L1 and L2 and the vertical axis represents the voltage signal level V output through photoelectric conversion elements 5A and 5B.

Here, the case in which the transport member 101 on which the first fixed-point detecting pattern 2A is arranged moves in the direction X1 and two light beams L1 and L2 are then incident on the first fixed-point detecting pattern 2A will be described. When the transport member 101 moves in the direction X1, the first light beam L1 is first incident on the diffraction grating 11A of the first fixed-point detecting pattern 2A. FIG. 6A represents the state in which the first fixed-point detecting pattern 2A is located at a position n7 and the beam spot of the first light beam L1 is then located at substantially the center of the diffraction grating 11A of the first fixed-point detecting pattern 2A.

As shown in FIG. 6A, the first light beam L1 incident on the diffraction grating 11A is diffracted by the diffraction grating 11A, thereby becoming a diffracted light beam La traveling in the direction Wa. At this time, any of photoelectric conversion elements 5A to 5C is not located ahead of the diffracted light beam La traveling in the direction Wa, so that any of them may not receive the diffracted light beam La. Therefore, when the first fixed-point detecting pattern 2A is located at the position n7, the voltage signal level output through any of the photoelectric conversion elements 5A to 5C becomes 0 (see FIG. 7).

When the transport member 101 further moves in the direction X1, the first light beam L1 is out of the diffraction grating 11A and the second light beam L2 is in turn incident on the diffraction grating 11A. FIG. 6B represents the state in which the first fixed-point detecting pattern 2A is located at a position n8 with respect to two light beams L1 and L2 and the beam spot of the second light beam L2 is located at substantially the center of the diffraction grating 11A.

As shown in FIG. 6B, the second light beam L2 incident on the diffraction grating 11A is diffracted by the diffraction grating 11A, thereby becoming a diffracted light beam La traveling in the direction Wa. At this time, the photoelectric conversion element 5A is located ahead of the diffracted light beam La traveling in the direction Wa. Thus, the diffracted light beam La is received by the photoelectric conversion element 5A and then converted into an electric signal. The electric signal converted by the photoelectric conversion element 5A is converted into a voltage signal in a manner similar to the first embodiment.

The first light-intensity curve D1 shown in FIG. 7 represents a change in the level of the voltage signal output through the photoelectric conversion element 5A and the second light-intensity curve D2 represents a change in the level of the voltage signal output through the photoelectric conversion element 5B. When the first fixed-point detecting pattern 2A is located at the position n8, the beam spot of the second light beam L2 is entirely located within the diffraction grating 11A. Thus, the voltage signal output through the photoelectric conversion element 5A will reach the maximum level.

When the transport member 101 further moves from the position n8 shown in FIG. 6B in the direction X1, the first light beam L1 is incident on the diffraction grating 11B while the second light beam L2 is being incident on the diffraction grating 11A. In FIG. 6C, the center of the beam spot of the first light beam L1 is located on the facing side 24 of the diffraction grating 11B and the center of the beam spot of the second light beam L2 is located on the facing side 23 of the diffraction grating 11A. In this state, the first fixed-point detecting pattern 2A is located at a position n9 with respect to two light beams L1 and L2.

As shown in FIG. 6C, the second light beam L2 incident on the diffraction grating 11A is diffracted by the diffraction grating 11A, thereby becoming a diffracted light beam La traveling in the direction Wa. Likewise, the first light beam L1 incident on the diffraction grating 11B is diffracted by the diffraction grating 11B, thereby becoming a diffracted light beam Lb traveling in the direction Wb. The photoelectric conversion elements 5A and 5B receive these diffracted light beams La and Lb and then convert them into electric signals, respectively. As in the case with the first embodiment, the electric signals converted by the photoelectric conversion elements 5A and 5B are converted into voltage signals, respectively.

When the first fixed-point detecting pattern 2A is located at a position n9, half the beam spot of the first light beam L1 is incident on the diffraction grating 11B, while half the beam spot of the second light beam L2 is being incident on the diffraction grating 11A. Therefore, as shown in FIG. 7, half the maximum output level of the voltage signal obtained through the photoelectric conversion element 5A is equal to half the maximum output level of the voltage signal obtained through the photoelectric conversion element 5B. A first fixed point P1 can be detected when a comparator (differential amplifier) detects the point where both the output levels are equal. In other words, the fixed-point detector 1 detects the first fixed point P1 when the first fixed-point detecting pattern 2A is located at the position n9.

Furthermore, a second fixed-point detecting pattern 3A (not shown) is mounted on the fixed-point detector 21. The second fixed-point detecting pattern 3A includes a pair of diffraction gratings 11B and 11C. In addition, the pair of diffraction gratings 11B and 11C is arranged in a manner similar to the pair of diffraction gratings 11A and 11B of the first fixed-point detecting pattern 2A. A second fixed point P2 can be detected when two light beams L1 and L2 are incident on the second fixed-point detecting pattern 3A.

According to the fixed-point detector 21 having the above-described configuration, the first fixed point P1 can be distinguished from the second fixed point P2 similarly to the fixed-point detector 1 of the first embodiment. For example, in the case of not using the second fixed point P2, the first fixed point P1 can be selected easily without preventing the second fixed-point detecting pattern 3A from light exposure.

Furthermore, the fixed-point detector is configured such that two light beams L1 and L2 can be respectively incident on the pair of diffraction gratings 11A and 11B. Thus, the two light beams L1 and L2 can be incident at the same angle on the pair of diffraction gratings 11A and 11B. Therefore, the fixed-point detecting light source 4 can be arranged optionally. In other words, as long as two light beams L1 and L2 are inclined at the same angle, the amounts of light incident on the pair of diffraction gratings 11A and 11B respectively are equal at the same position (position n9) even when the transport member 101 is displaced in a direction perpendicular to the plane surface thereof. Therefore, the fixed point can be determined without measuring errors even when the transport member 101 is displaced in a direction perpendicular to the plane surface thereof.

Figure 8:
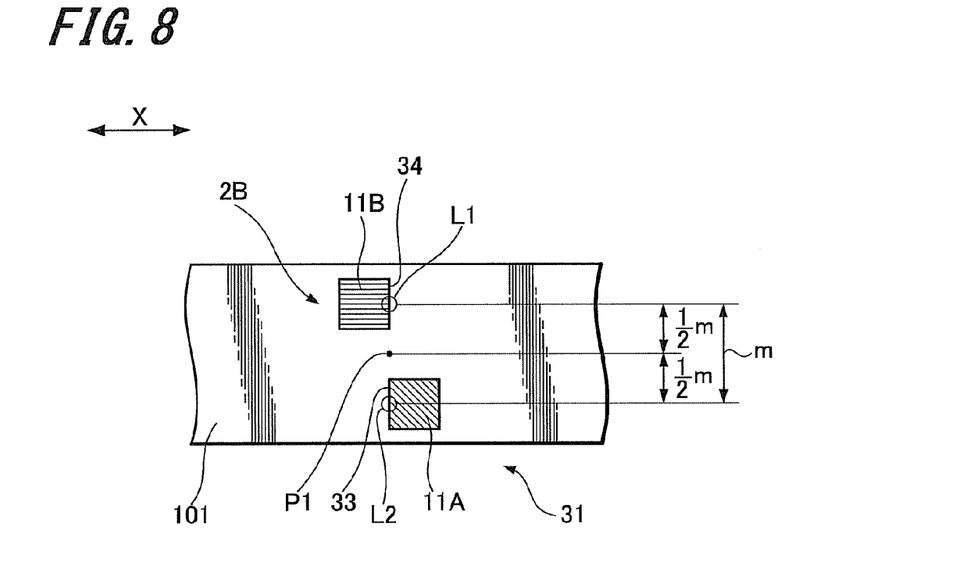
FIG. 8 is a schematic diagram illustrating a fixed-point detector according to a third embodiment of the present invention.

FIG. 8 illustrates a fixed-point detector as a third embodiment of the present invention. The fixed-point detector 31 has the same construction as that of the fixed-point detector 1 of the first embodiment, except for the arrangement of a pair of diffraction gratings of a fixed-point detecting pattern. Hereinafter, therefore, the arrangement of the pair of diffraction gratings of the fixed-point detecting pattern will be described first, and the same structural components as those of the fixed-point detector 1 are denoted by the same reference numerals and the redundant description thereof will be omitted.

For the arrangement of the pair of diffraction gratings in the fixed-point detector 31, a first fixed-point detecting pattern 2B will be described as an example. The first fixed-point detecting pattern 2B of the fixed-point detector 31 is mounted on a transport member 101 and includes a pair of diffraction gratings 11A and 11B which are formed in the same square shape. The pair of diffraction gratings 11A and 11B are symmetrically arranged with respect to a fixed point P1 to be detected. In the present embodiment, the diffraction gratings 11A and 11B in a pair are positioned without a distance between them in the measurement-axis direction X. In other words, the side 33 of the diffraction grating 11A and the side 34 of the diffraction grating 11B are perpendicular to the measurement-axis direction X and extend on the same line across the fixed point P1 extending perpendicularly to the measurement-axis direction X.

As in the case with the second embodiment, light L output from a fixed-point detecting light source 4 (not shown) is divided into two light beams, a first light beam L1 and a second light beam L2, by a half mirror (not shown) and then incident on a first fixed-point detecting pattern 2B. In other words, the first light beam L1 and the second light beam L2 are incident on different points at a predetermined distance m from each other in a direction perpendicular to the measurement-axis direction X. In the present embodiment, the distance from the center of the beam spot of the light beam L1 to the center of the beam spot of the light beam L2 is selected to be equal to the distance from the center of the diffraction grating 11A to the center of the diffraction grating 11B in a direction perpendicular to the measurement-axis direction X.

In this way, the positions irradiated with the first light beam L1 and the second light beam L2 are defined respectively.

Thus, half the beam spot of the first light beam L1 can be incident on the diffraction grating 11B. Simultaneously, half the beam spot of the second light beam L2 can be incident on the diffraction grating 11A. As a result, half the maximum output level of a voltage signal obtained through the photoelectric conversion element 5A (not shown) is equal to half the maximum output level of the voltage signal obtained through the photoelectric conversion element 5B (not shown). A first fixed point P1 can be detected when a comparator (differential amplifier) detects the point where both the output levels are equal.

In addition, the fixed-point detector 31 is provided with a second fixed-point detecting pattern 3B (not shown). Here, the second fixed-point detecting pattern 3B includes a pair of diffraction gratings 11B and 11C. The pair of diffraction gratings 11B and 11C of the second fixed-point detecting pattern 3B is arranged in a manner similar to the pair of diffraction gratings 11A and 11B of the first fixed-point detecting pattern 2B. Two different light beams L1 and L2 are incident on the second fixed-point detecting pattern 3B to detect a second fixed point P2.

Therefore, the fixed-point detector 31 having the above-described configuration can obtain the same effects as those obtained by the fixed-point detector 21 of the second embodiment. Therefore, the determination of the first fixed point P1 and the second fixed point P2 can be prevented from causing errors if the transport member 101 is rotationally displaced in a direction perpendicular to the measurement-axis direction X.

Figure 9:
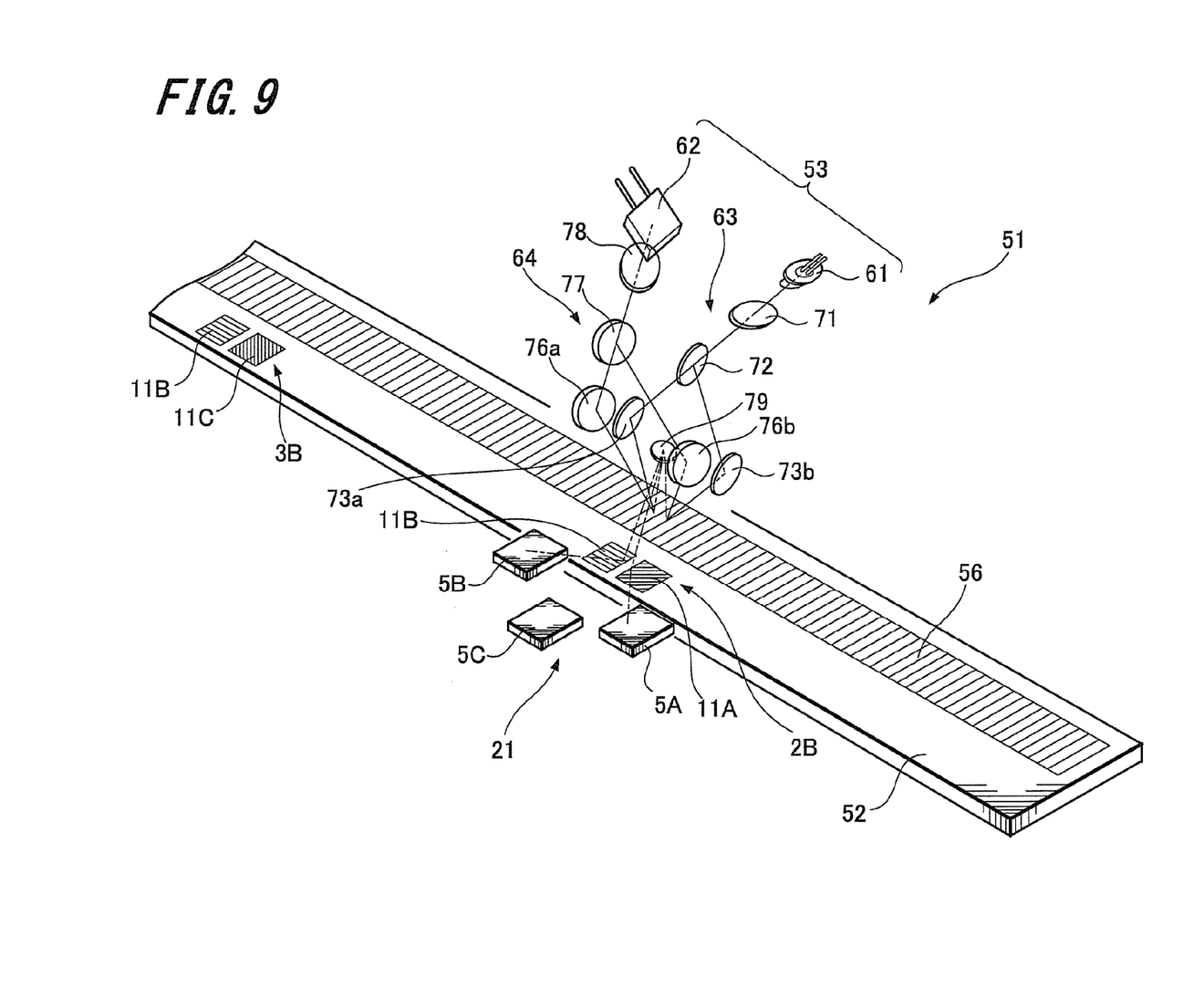
FIG. 9 is an explanatory view of a displacement-measuring apparatus on which the fixed-point detector according to the second embodiment of the present invention is mounted.

FIG. 9 illustrates a displacement-measuring apparatus including a fixed-point detector 21 having the above configuration and working as described above. The displacement-measuring apparatus 51 represents a linear displacement-measuring apparatus that measures linear displacement. As shown in FIG. 9, the displacement-measuring apparatus 51 includes a scale 52 on which a displacement-measuring diffraction grating 56 is formed in the measurement-axis direction X; a detection head 53 which can move in the measurement-axis direction X with respect to the scale 52; and the fixed-point detector 21.

The scale 52 includes a base material 55 (not shown) and the displacement-measuring diffraction grating 56 formed on the surface of the base material 55. The scale 52 is formed of a thin strip (tape) extending in the measurement axis direction X. The base material 55 may be made of stainless steel (SUS) having small thermal expansion and high strength. Alternatively, the base material 55 of the scale 52 in accordance with the embodiment of the present invention is not limited to the stainless steel (SUS), so that it may be, for example, made of any of other materials such as aluminum and copper.

The displacement-measuring diffraction grating 56 of the scale 52 includes a plurality of slits being disposed at appropriate intervals in the measurement-axis direction X. The displacement-measuring diffraction grating 56 can be formed by, for example, coating the surface of the base material 55 with a metal thin film, such as one made of Cr, and then subjecting the metal thin film to photo-etching.

The detection head 53 includes a displacement-measuring light source 61, a displacement-measuring photoelectric conversion element 62, a first optical system 63, and a second optical system 64. The displacement-measuring light source 61 of the detection head 53 may be, for example, a light-emitting diode (LED). The first optical system 63 guides light output from the displacement-measuring light source 61 into the displacement-measuring diffraction grating 56 of the scale 52. On the other hand, the second optical system 64 guides light diffracted by the displacement-measuring diffraction grating 56 into the displacement-measuring photoelectric conversion element 62. The displacement-measuring photoelectric conversion element 62 receives the diffracted light guided by the second optical system 64 and then converts it into an electric signal. The displacement-measuring photoelectric conversion element 62 may be, for example, a photodiode (PD) or a phototransistor.

The first optical system 63 of the detection head 53 includes a lens 71, a half mirror 72, and a pair of mirrors 73a and 73b. The lens 71 is provided for allowing light emitted from the displacement-measuring light source 61 to form an image as a beam spot with an appropriate size on the displacement-measuring diffraction grating 56. The half mirror 72 is provided for dividing light passing through the lens 71 into two light beams. In addition, the mirrors 73a and 73b are provided for reflecting two light beams divided by the half mirror 72 to be respectively incident on the displacement-measuring diffraction grating 56.

In addition, the second optical system 64 includes a pair of mirrors 76a and 76b, a half mirror 77, and a polarizer 78. The mirrors 76a and 76b are provided for reflecting the respective light beams diffracted by the displacement-measuring diffraction grating 56. The half mirror 77 is provided for combining the diffracted light beams reflected by the respective mirrors 76a and 76b. In addition, the polarizer 78 is provided for guiding the light combined by the half mirror 77 into the displacement-measuring photoelectric conversion element 62. The displacement-measuring diffraction grating 56 diffracts incident light into plural orders of diffracted light. In the present embodiment, the second optical system 64 guides the positive first-order diffracted light beam among the light beams diffracted by the displacement-measuring diffraction grating 56 to the displacement-measuring photoelectric conversion element 62.

In addition, the detection head 53 is provided with a fixed-point detecting mirror 79. The fixed-point detecting mirror 79 is one responsible for reflecting other diffracted light beams than the positive first-order light beam diffracted by the displacement-measuring diffraction grating 56 to be incident on the respective fixed-point detecting patterns 2B and 3B of the fixed-point detector 21. In the present embodiment, the fixed-point detecting mirror 79 reflects a negative first-order light beam diffracted by the displacement-measuring diffraction grating 56. In other words, in this embodiment, the displacement-measuring light source 61 of the displacement-measuring apparatus 51 also serves as a fixed-point detecting light source without the fixed-point detecting light source 4 of the fixed-point detector 21.

The fixed-point detector 21 is formed as described above (but not including the fixed-point detecting light source 4). The fixed-point detecting patterns 2B, 3B of the fixed-point detector 21 are mounted on the scale 52 which represents a specific example of the transport member. Three photoelectric conversion elements 5A, 5B, and 5C are mounted on the detection head 53 which represents a specific example of the fixing member.

The displacement-measuring apparatus 51 as described above is able to detect the first fixed point P1 and the second fixed point P2 by the fixed-point detector 21, so that these fixed points P1 and P2 can be distinguished from each other. Furthermore, the displacement-measuring light source 61 of the displacement-measuring apparatus 51 also serves as a fixed-point detecting light source. Thus, the number of structural parts can be reduced. As a result, the detection head 53 can be made small and the total cost of manufacturing the device can be reduced.

In the present embodiment, the first fixed-point detecting pattern 2B and the second fixed-point detecting pattern 3B are provided for detecting the first fixed-point P1 and the second fixed-point P2, respectively. Alternatively, the fixed-point detector 21 may be provided with three or more fixed-point detecting patterns to detect three or more fixed points. As the fixed-point detector 21 is configured to detect a large number of fixed points, the absolute position (fixed point) can be detected by moving the scale 52 a short distance and the time required for the measurement can be reduced.

Figure 10:
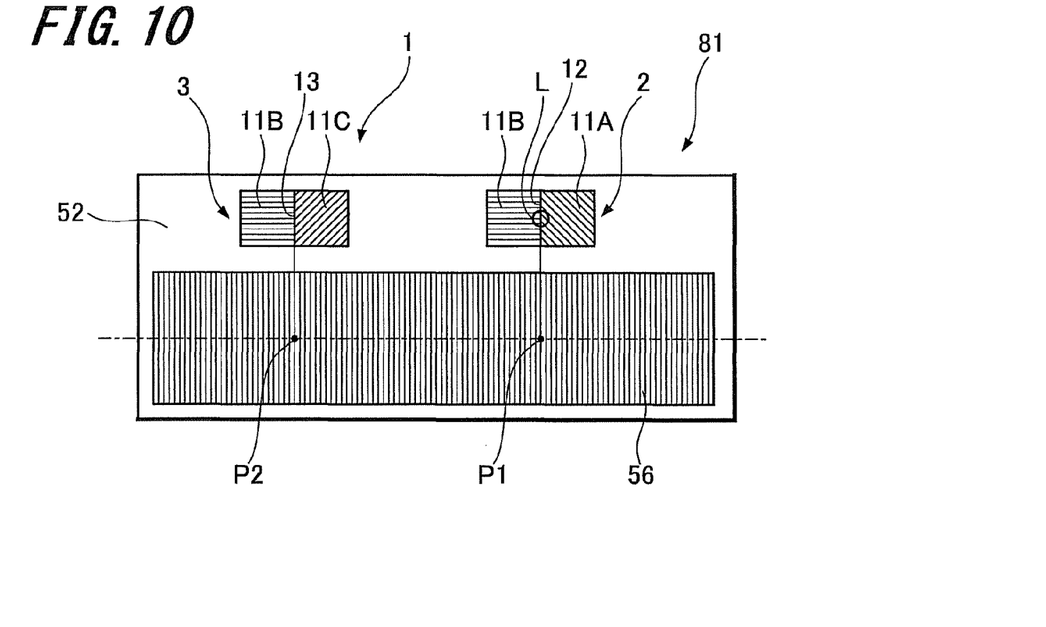
FIG. 10 is a displacement-measuring apparatus on which the fixed-point detector according to the first embodiment of the present invention is mounted.

FIG. 10 is a schematic diagram illustrating a displacement-measuring apparatus having the fixed-point detector 1 as described above. The displacement-measuring apparatus 81 includes a scale 52 and a detection head (not shown) which have the same configurations as those of the scale 52 and the detection head 53 of the displacement-measuring apparatus 51. In the fixed-point detector 1, light incident on a first fixed-point detecting pattern 2 and a second fixed-point detecting pattern 3 may be only light L. Therefore, in the case where a displacement-measuring light source 61 of the displacement-measuring apparatus 51 also serves as a fixed-point detecting light source, one of the negative first-order light beams diffracted by a displacement-measuring diffraction grating 56 is used. On this occasion, light L is perpendicularly incident on either the first fixed-point detecting pattern 2 or the second fixed-point detecting pattern 3.

The displacement-measuring apparatus 81 as described above is able to detect the first fixed point P1 and the second fixed point P2 by the fixed-point detector 21, and these fixed points P1, P2 can be distinguished from each other.

Figure 11:
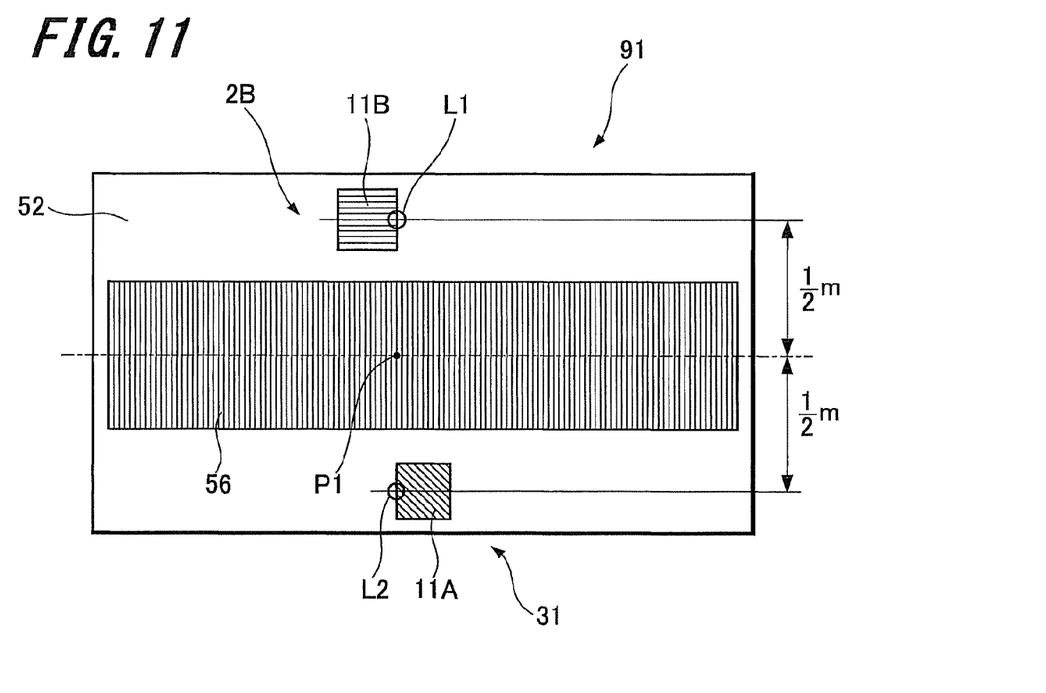
FIG. 11 is a displacement-measuring apparatus on which the fixed-point detector according to the third embodiment of the present invention is mounted.

FIG. 11 is a schematic diagram illustrating a displacement-measuring apparatus having the fixed-point detector 31 as described above. The displacement-measuring apparatus 91 includes a scale 52 and a detection head (not shown) which have the same configurations as those of the scale 52 and the detection head 53 of the displacement-measuring apparatus 51. A pair of diffraction gratings 11A and 11B, which is included in a first fixed-point detecting pattern 2B of a fixed-point detector 31, is symmetrically arranged with respect to a first fixed point P1 located at the middle of a displacement-measuring diffraction grating 56 in the width direction thereof (i.e., the direction perpendicular to the measurement-axis direction X). In addition, a second fixed-point detecting pattern 3B (not shown) is also arranged in a manner similar to the first fixed-point detecting pattern 2B.

According to the displacement-measuring apparatus 91 having such a configuration, a first fixed point P1 and a second fixed point P2 can be detected and distinguished from each other. In addition, the detection of a fixed point can be prevented from causing errors in the displacement of the scale 52 in a direction perpendicular to the plane surface thereof. Furthermore, the fixed point can be detected accurately even in the case of rotational displacement of the scale 52 in a direction perpendicular to the measurement-axis direction X.

Figure 12A:
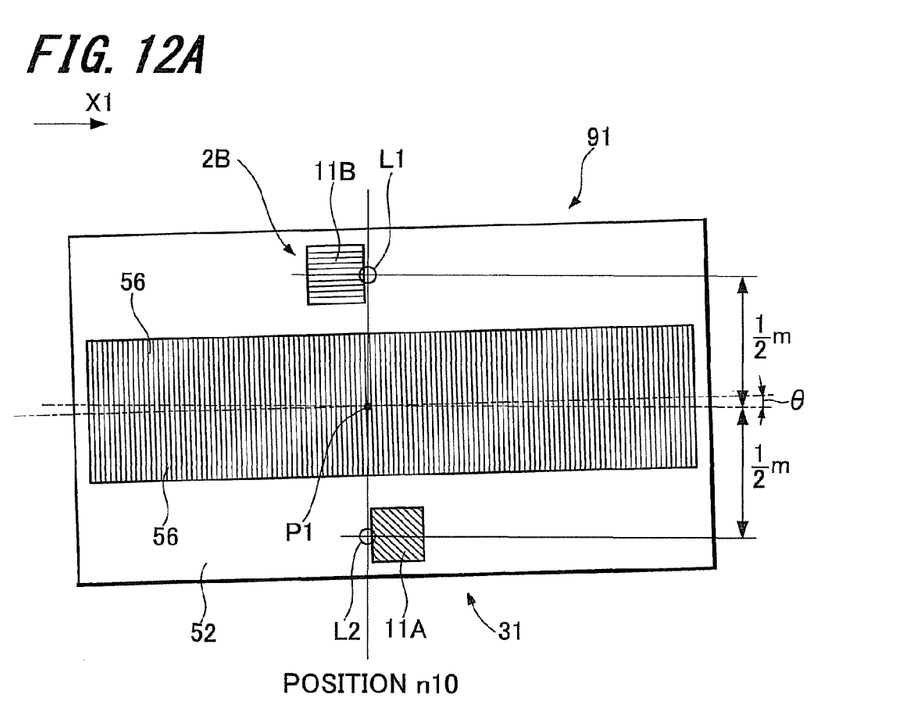
FIG. 12A is an explanatory view of a state in which a first fixed point is detected using a first fixed-point detecting pattern.
Figure 12B:
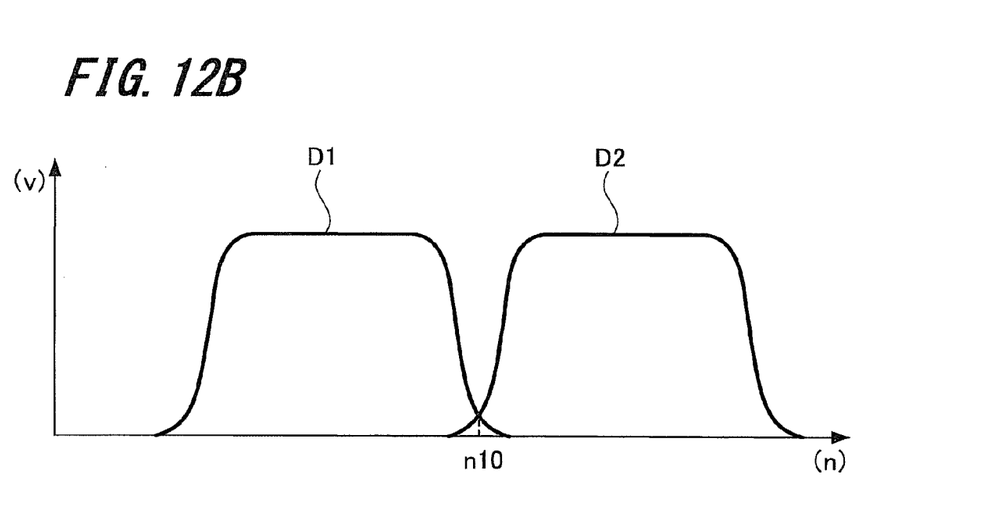
FIG. 12B is a graphical view of light-intensity curves representing changes in output levels of electric signals converted by two photoelectric conversion elements corresponding to a pair of diffraction gratings of the first fixed-point detecting pattern when the scale is in a rotationally displaced state.

Referring to FIGS. 12A and 12B, the rotational displacement of the scale 52 in a direction perpendicular to the measurement-axis direction X will be described. FIG. 12A is a schematic diagram illustrating a state in which the scale 52 is rotationally displaced in a direction perpendicular to the measurement-axis direction X. FIG. 12B illustrates light-intensity curves representing changes in output levels of electric signals converted by the respective photoelectric conversion elements 5A and 5B in the state in which the scale 52 is rotationally displaced in a direction perpendicular to the measurement-axis direction X. In FIG. 12B, the horizontal axis represents the position n of the first fixed-point detecting pattern 2B and the vertical axis represents the level V of the voltage signal output through each of the photoelectric conversion elements 5A and 5B.

As shown in FIG. 12A, the scale 52 is rotationally displaced at an angle θ about the first fixed point P1. In this case, the first fixed-point detecting pattern 2B is located at a position n10 with respect to two light beams L1 and L2. At the position n10, when the scale 52 is not rotationally displaced, half the beam spot of a first light beam L1 is incident on a diffraction grating 11B and half the beam spot of a second light beam L2 is incident on the diffraction grating 11A (see FIG. 11). In other words, the fixed-point detector 91 is able to detect the first fixed point P1 when a first fixed point detecting pattern 2B is located at the position n10.

The diffraction gratings 11A and 11B in a pair are symmetrically arranged with respect to the first fixed point P1. Therefore, even in a state where the scale 52 is in a rotationally displaced state, with a first fixed-point detecting pattern 2B being located at the position n10, the area of the diffraction grating 11 on which the first light beam L1 is incident becomes equal to the area of the diffraction grating 11A on which the second light beam L2 is incident. Here, these areas are smaller than half the respective beam spots.

A first light-intensity curve D1 shown in FIG. 12B represents a change in the level of voltage signal output through a photoelectric conversion element 5A (not shown). A second light-intensity curve D2 shown in the figure represents a change in the level of voltage signal output through a photoelectric conversion element 5B (not shown).

As shown in FIG. 12B, at the position n10, the output level of the voltage signal obtained through the photoelectric conversion element 5A (not shown) equals to the output level of the voltage signal obtained through the photoelectric conversion element 5B (not shown) at the level smaller than half the maximum level. A first fixed point P1 can be detected when a comparator (differential amplifier) detects the point where both the output levels are equal. Therefore, the displacement-measuring apparatus 91 is able to detect the first fixed point P1 when the first fixed-point detecting pattern 2B is located at the position n10 in a manner similar to one without rotational displacement even though a base material 52 is rotationally displaced.

As described above, the fixed-point detector and the displacement-measuring apparatus in accordance with the embodiments of the present invention are configured so that two different photoelectric conversion elements are combined together to respectively receive two light beams diffracted from the corresponding fixed-point detecting patterns. Therefore, the individual fixed-point detecting patterns can be distinguished from a plurality of fixed-point detecting patterns, so that fixed points obtained from the respective fixed-point detecting patterns can be easily selected.

The present invention is not limited to the embodiments as described above and illustrated in the attached drawings, and it is to be understood that changes and variations may be made without departing from the spirit or scope of the present invention. For example, in any of the aforementioned embodiments, a rotary displacement-measuring apparatus may be employed for measuring rotational displacement instead of employing the linear displacement-measuring apparatus for measuring linear displacement which has been exemplified in the above description.

It should be understood by those skilled in the art that various modifications, combinations, sub-combinations and alterations may occur depending on design requirements and other factors insofar as they are within the scope of the appended claims or the equivalents thereof.

What is claimed is:

1. A fixed-point detector, comprising:
a plurality of fixed-point detecting patterns each having a pair of diffraction gratings for diffracting incident light in different directions and being arranged at an appropriate distance from one another in a measurement-axis direction;
a fixed-point detecting light source which irradiates the pair of diffraction gratings of each of the fixed-point detecting patterns with light while moving in the measurement-axis direction with respect to the plurality of fixed-point detecting patterns; and
a plurality of photoelectric conversion elements which move together with the fixed-point detecting light source, while receiving light beams diffracted by the respective diffraction gratings of the plurality of fixed-point detecting patterns and converting the diffracted light beams into electric signals,
wherein,
different combinations of two photoelectric conversion elements for receiving two light beams diffracted by the diffraction gratings of the respective fixed-point detecting patterns are employed such that a first fixed point associated with a first fixed-point detecting pattern employs a different combination of two photoelectric conversion elements of the plurality of conversion elements than a second fixed point associated with a second fixed-point detecting pattern
the first fixed point detecting pattern includes a different set of diffraction gratings than the second fixed point detecting pattern; and
a fixed point is defined as a point at which a level of an electric signal converted by one of the two photoelectric conversion elements is equal to a level of an electric signal converted by the other of the two photoelectric conversion elements.

2. The fixed-point detector according to claim 1, wherein:
two diffraction gratings of each of the fixed-point detecting patterns are arranged so that the two diffraction gratings abut on each other in the measurement-axis direction; and
levels of two electric signals detected by the corresponding photoelectric conversion elements are equal when a point irradiated with light from the fixed-point detecting light source is on a boundary line between the two diffraction gratings.

3. The fixed-point detector according to claim 1, wherein:
two diffraction gratings of each of the fixed-point detecting patterns are arranged apart from each other; and
the two diffraction gratings are irradiated with respective light beams from the fixed-point detecting light source and a distance between the light beams incident on the two diffraction gratings is set to a predetermined distance to allow levels of two electric signals detected by two photoelectric conversion elements corresponding to the respective two diffraction gratings to be equal at a point.

4. The fixed-point detector according to claim 3, wherein the two diffraction gratings of the respective fixed-point detecting patterns are symmetrically arranged with respect to a fixed point to be detected.

5. The fixed-point detector of claim 1, wherein,
the first fixed-point detecting pattern includes a first pair of diffraction gratings and the second fixed-point detecting pattern includes a second pair of diffraction gratings, and a common diffracting grating is included as one of the diffraction gratings within both the first pair of diffraction gratings and the second pair of diffraction gratings.

6. A displacement-measuring apparatus, comprising:

a scale having a displacement-measuring diffraction grating arranged along a measurement axis;

a detection head having a displacement-measuring light source irradiating the displacement-measuring diffraction grating with light while moving in the direction of the measurement axis with respect to the scale, and a displacement-measuring photoelectric conversion element, which receives light diffracted by the displacement-measuring diffraction grating and converts the light into an electric signal; and a fixed-point detector detecting a fixed point of the detection head with respect to the scale, wherein the fixed-point detector includes:

(a) a plurality of fixed-point detecting patterns each having a pair of diffraction gratings for diffracting incident light in different directions and being arranged at an appropriate distance from one another in a measurement-axis direction;

(b) a fixed-point detecting light source which irradiates the pair of diffraction gratings of each of the fixed-point detecting patterns with light while moving in the measurement-axis direction with respect to the plurality of fixed-point detecting patterns; and (c) a plurality of photoelectric conversion elements which move together with the fixed-point detecting light source, while receiving light beams diffracted by the respective diffraction gratings of the plurality of fixed-point detecting patterns and converting the diffracted light beams into electric signals, and wherein, different combinations of two photoelectric conversion elements for receiving two light beams diffracted by the diffraction gratings of the respective fixed-point detecting patterns are employed such that a first fixed point associated with a first fixed-point detecting pattern employs a different combination of two photoelectric conversion elements of the plurality of photoelectric conversion elements than a second fixed point associated with a second fixed-point detecting pattern;

the first fixed point detecting pattern includes a different set of diffraction gratings than the second fixed point detecting pattern; and a fixed point is defined as a point at which a level of an electric signal converted by one of the two photoelectric conversion elements is equal to a level of an electric signal converted by the other of the two photoelectric conversion elements.

7. The displacement-measuring apparatus according to claim 6, further comprising:

a fixed-point detecting mirror, which reflects a diffracted light beam of an order not used in a displacement measurement among light beams diffracted by the displacement-measuring diffraction grating to allow the displacement-measuring light source to also serve as a fixed-point detecting light source.

8. The displacement-measuring apparatus of claim 6, wherein, the first fixed-point detecting pattern includes a first pair of diffraction gratings and the second fixed-point detecting pattern includes a second pair of diffraction gratings, and a common diffracting grating is provided as one of the diffraction gratings within the first pair of diffraction gratings and the second pair of diffraction gratings.

* * * * *